Oct. 17, 1950
A. E. VOYSEY
2,526,594
SEAL AND BEARING FOR ROTARY
SHAFTS OF GAS COMPRESSORS
Filed Oct. 30, 1947
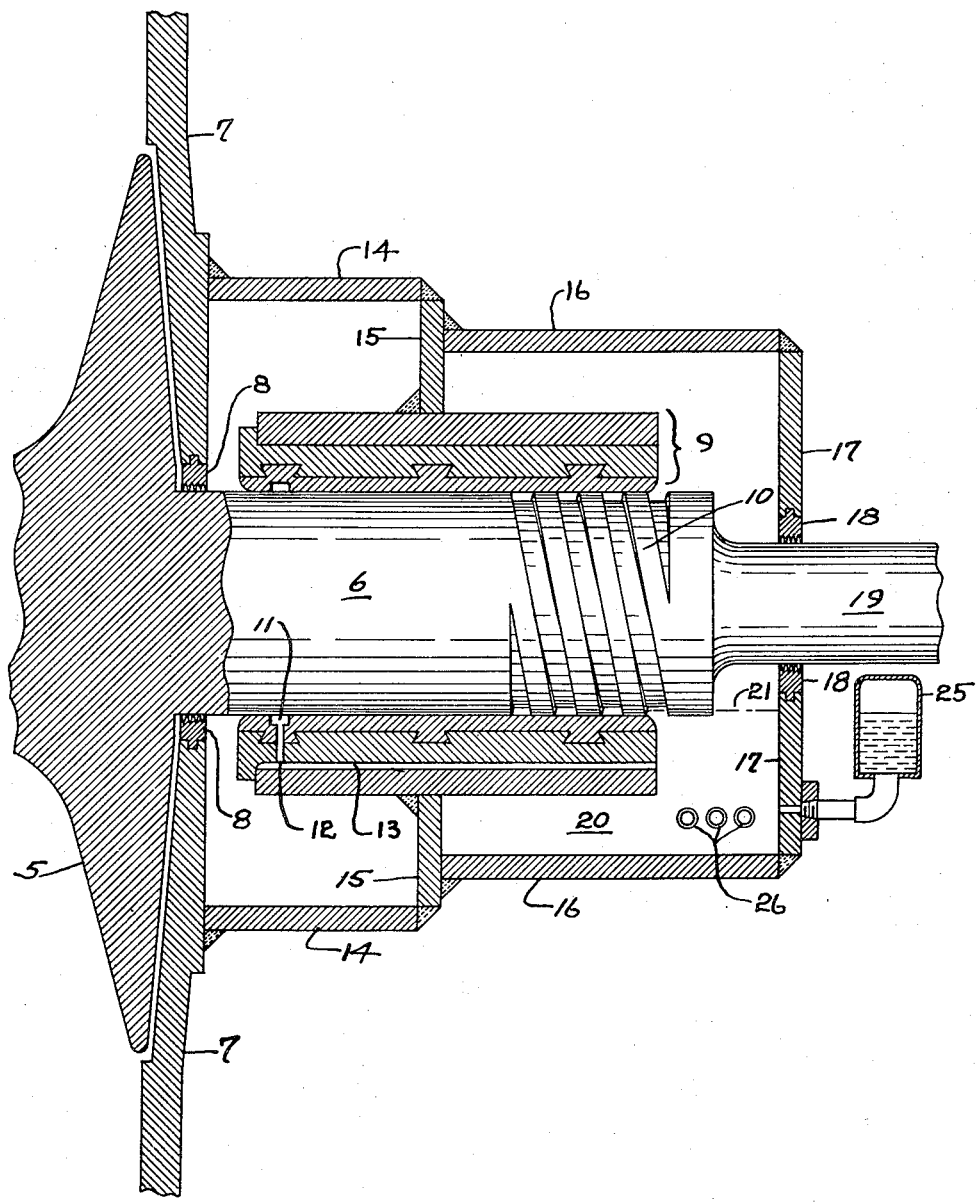
INVENTOR
ALFRED E. VOYSEY
BY Robert T. Palmer
Attorney Patented Oct. 17, 1950

2,526,594

UNITED STATES PATENT OFFICE 2,526,594

SEAL AND BEARING FOR ROTARY SHAFTS OF GAS COMPRESSORS

Alfred E. Voysey, West Newton, Mass., assignor to Westinghouse Electric Corporation, East Pittsburgh, Pa., a corporation of Pennsylvania Application October 30, 1947, Serial No. 783,027

2 Claims. (Cl. 308—36.3)

This invention relates to seals and bearings for rotary shafts, and has as an object the combination in one unit of a liquid seal for the shaft and a bearing therefor.

In artificial gas producing plants, the gas is blown under considerable pressure through blowers. The gas is inflammable and provision therefore must be made to make sure that no gas can escape from the blowers along the rotary shafts thereof. It is the usual practice to provide water seals for the blower shafts, and to provide in addition, separate conventional bearings for the shafts.

This invention provides an oil seal and a bearing for the shaft of a blower, which are combined in one relatively simple and inexpensive unit. A helical gear pump on the shaft pumps oil along the shaft towards the blower wheel to oppose and prevent the leakage of gas along the shaft, and at the same time lubricates the bearing.

The invention will now be described with reference to the drawing which is a view in cross-section of a combined shaft seal and shaft bearing embodying this invention, a portion of the associated blower wheel and casing being shown in section.

The blower wheel 5 is supported upon the rotary shaft 6, and the casing of the blower has the side wall 7 with the conventional labyrinth seal 8 contacting the shaft where it passes through the casing, and which aids in preventing the leakage of gas along the shaft.

The shaft 6 has the bearing 9 therearound, and on the shaft within and extending from the outer end of the bearing, the helical gear teeth 10 are formed.

The cylindrical wall 14 extends from the side wall 7 of the blower casing to about the center of the bearing 9, and has the vertical wall 15 connected at its end to the outer wall of the bearing. The wall 15 is welded to the side wall 7 and to the vertical wall 15, and the wall 15 is welded to the outer wall of the bearing, these walls thus forming an enclosure preventing the escape of gas from the blower casing along the shaft 6 except through the bearing.

The cylindrical wall 16 is welded to the outer side of the vertical wall 15 and extends beyond the bearing 9 and the gear teeth 10 formed on the shaft 6, and has welded to its outer end the vertical wall 17 which has the conventional labyrinth seal 18 contacting the outer portion 19 of the shaft of reduced diameter. The oil reservoir 20 is formed in the lower portion of the enclosure formed by the walls 15, 16 and 17, and which has an oil level 21 maintained by the make-up tank 25 above the lower surfaces of the gear teeth 10 on the shaft 6.

The inner surface of the bearing adjacent its inner end has the circumferentially extending oil slot 11 which is connected at the underside of the bearing by the vertically extending passage 12 in the bearing, to the horizontally extending passage 13 in the bearing. The passage 13 discharges oil into the reservoir 20.

The reservoir 20 has the oil cooling coils 26 therein and through which a cooling fluid may be circulated for cooling the oil, this construction being conventional.

In operation, the shaft 6 is rotated in the direction to cause the helical teeth 10 to pump oil from the reservoir 20 along the surface of the shaft through the bearing to the oil slot 11 where it collects and from which it is returned through the passages 12 and 13 to the reservoir 20. The oil is pumped under sufficient pressure to overcome the pressure of the gas tending to pass along the surface of the shaft through the bearing so that escape of the gas from the blower along its shaft 6 is prevented. The pressure speed characteristics of blowers and of helical gear pumps are similar so that at different speeds the pressure provided by the pump will balance that provided by the blower.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. A combined bearing and seal for the rotary shaft of a gas compressor having a gas compressing rotor on the shaft, and having a casing around the rotor, the shaft extending through the casing to the exterior thereof, comprising a bearing extending around the shaft exterior of the casing, a housing extending around the bearing and sealed to the casing, an oil reservoir formed in the housing under the outer end of the bearing, said bearing having a circumferentially extending slot formed in the inner surface of its inner portion, spiral gear teeth formed on the shaft within the outer portion of the bearing and extending from said outer end thereof into said reservoir, said teeth being arranged to pump during rotation of said shaft, oil from said reservoir along said shaft towards said casing for lubricating said bearing and into said slot for opposing the leakage of gas from said casing along said shaft past said slot, and means for returning the oil from said slot into said reservoir.

2. A combined bearing and seal as claimed in claim 1 in which the oil returning means includes a horizontally extending passage in the lower portion of the bearing and discharging into the reservoir, and a vertically extending slot interconnecting the circumferentially extending slot and the passage.

ALFRED E. VOYSEY.

REFERENCES CITED

The following references are of record in the file of this patent:

UNITED STATES PATENTS

| Number | Name | Date |
|---|---|---|
| 1,150,485 | Bentley | Aug. 17, 1915 |
| 2,430,752 | Yager | Nov. 11, 1947 |